United States Patent [19]

Goettl

[11] 4,237,859

[45] Dec. 9, 1980

[54] THERMAL ENERGY STORAGE AND UTILIZATION SYSTEM

[76] Inventor: Adam D. Goettl, 4960 E. Palomino Rd., Phoenix, Ariz. 85018

[21] Appl. No.: 790,339

[22] Filed: Apr. 25, 1977

Related U.S. Application Data

[63] Continuation-in-part of Ser. No. 605,649, Aug. 18, 1975, abandoned.

[51] Int. Cl.³ .............................................. F24H 7/04
[52] U.S. Cl. .................................... 126/400; 126/437; 165/45; 405/53
[58] Field of Search ............... 237/1 A, 2 B; 126/270, 126/271, 400, 429, 437; 165/29, 48, 45; 62/2, 238, 435; 61/0.5; 220/18, 63 R; 138/149; 405/53

[56] References Cited

U.S. PATENT DOCUMENTS

| | | | |
|---|---|---|---|
| 1,969,187 | 8/1934 | Schott | 237/1 A X |
| 2,677,243 | 5/1954 | Telkes | 126/270 X |
| 3,111,371 | 11/1963 | Bull | 61/0.5 X |
| 3,383,004 | 5/1968 | Closner | 220/9 F |
| 3,752,354 | 8/1973 | Demirag | 220/63 R |
| 3,874,189 | 4/1975 | Calim | 220/63 R X |
| 3,918,605 | 11/1975 | Butler | 220/63 R |
| 3,933,263 | 1/1976 | Frew et al. | 220/63 R X |
| 4,010,731 | 3/1977 | Harrison | 126/400 X |
| 4,011,736 | 3/1977 | Harrison | 62/435 X |

Primary Examiner—William E. Tapolcai, Jr.
Attorney, Agent, or Firm—Herbert E. Haynes, Jr.

[57] ABSTRACT

A thermal energy storage and utilization system including at least a pair of especially configured liquid containing tanks interconnected by a heat exchanger for transferring thermal energy therebetween so that one of the tanks becomes a cold storage tank and the other becomes a heat storage tank. Various types of thermal energy input and output devices are connected to the liquid containing tanks for selectively supplying and/or utilizing the thermal energy stored therein.

9 Claims, 3 Drawing Figures

THERMAL ENERGY STORAGE AND UTILIZATION SYSTEM

CROSS REFERENCE TO RELATED APPLICATION

This application is a continuation-in-part of copending U.S. Patent Application Ser. No. 605,649, filed Aug. 18, 1975, entitled, THERMAL ENERGY STORAGE AND UTILIZATION SYSTEM, by the same inventor, now abandoned.

BACKGROUND OF THE INVENTION

1. Field of the Invention

This invention relates to thermal energy storage and utilization and more particularly to a system for storage of thermal energy in especially configured liquid containing tanks.

2. Description of the Prior Art

The attention which has only recently been directed to the various problems relating to energy has caused some concern as to the wasteful and otherwise inefficient manner in which energy is employed to accomplish the many tasks upon which society has come to depend. The equipment and techniques currently being employed to accomplish those tasks have more or less evolved rather than being the result of a plan, and since much of this evolution took place in an era of plenty, very little effort has been expended on the efficiency of such techniques and equipment.

In particular, the various types of equipment currently being employed to perform heating and cooling tasks operate on what may be called a demand basis, and such a technique results in wasted energy and other energy related problems. These problems resulting from the demand basis technique may be placed in three major problem areas with the first being demand timing, the second being the intermittent delivery and the third being the fluctuating amounts of energy that must be supplied to satisfy the demand.

To explain the term demand basis, consider a home which is either too hot or too cold. That fact is sensed by a thermostat which actuates the appropriate equipment and when the demand has been satisfied, the equipment is shut down.

With regard to the first problem area defined above as demand timeing, the demand for heating and/or cooling invariably occurs at times when those tasks are most inefficiently accomplished. For example, it is well known that a heat pump is an efficient mechanism; however, the demand basis under which the heat pump is forced to operate substantially reduces the efficiency of that equipment. During a heating cycle, the heat pump will extract heat from the atmosphere and direct it to the zone being heated. The demand for heat in the zone is of course, the greatest when the temperature is low and the atmosphere contains a relatively small amount of readily available heat. Due to this lack of readily available heat during the peak demand time, the heat pump must work hard to accomplish the task being asked of it. The same basic inefficiency exists during a cooling cycle of the heat pump due to the heat extracted from the zone being dissipated into an atmosphere that already contains a relatively large quantity of heat. Thus, to accomplish satisfactory operation under such conditions, the equipment must be relatively large to compensate for the inefficient operation resulting from demand timing and it is readily apparent that operating equipment inefficiently results in the consumption of power at a rate which is excessive for the amount of work being accomplished.

In regard to the second problem area defined above as intermittent delivery, consider a zone being heated with the thermostat set at 70 degrees. Due to intermittent delivery, the temperature in the zone will vary in a range of from about 67 to 74 degrees. When the temperature in the zone falls to about 67 degrees, the heating equipment is started and will continue to operate until the zone temperature reaches about 74 degrees at which time the equipment is shut off. The temperature will then drop until the 67 degree level is reached again and the heating cycle is repeated. This temperature drop is nonlinear due to the varying heat loss at the different temperatures, with the heat loss being considerably greater at 74 degrees than at the lower temperatures. It is well known that heat loss through walls, ceilings, windows and the like is determined by the temperature differential on opposite sides thereof. Thus, the temperature drop from 74 degrees to 70 degrees will be relatively rapid and will slow down in the drop from 70 degrees to 67 degrees. The zone will therefore fluctuate in temperature and will be below the desired 70 degrees level the greatest percentage of the time. It will be obvious that the exact opposite temperature fluctuations will occur when a zone is being cooled. Such temperature fluctuations in conjunction with the duration of the undesirable temperatures results in discomfort often resulting in upward or downward adjustments of the thermostat. Such discomfort is but one drawback of an intermittent delivery system with other drawbacks being the relatively high power consumption and heat loss or heat gain of such a system when compared with one of constant delivery. The power consumed in repeatedly starting and stopping equipment is well known to be greater than the power consumed in continuous operation thereof. Also, repeated actuation of such equipment to raise or lower the temperature utilizes more energy than constantly delivering properly conditioned air to maintain the desired temperature. By maintaining a constant comfortable temperature, the increased heat loss or heat gain which occurs at fluctuating temperatures is avoided.

The third problem area relating to the fluctuating amounts of energy supplied to satisfy the demand basis technique will be easily understood upon reconsideration of the hereinbefore described examples relating to heating and cooling. It has been established that the demand for heating and cooling is the greatest when it is the most difficult to accomplish those tasks. Those demands plus other energy consuming habits of the consumers cause tremendous fluctuations in energy consumption to occur over a given time period. For example, in hot weather, electric power generating facilities will be operating at or near capacity from approximately 3:00 P.M. to 8:00 P.M. and will be operating considerably below capacity at other times of the day. Such inconsistent energy demands cause problems for the utility companies and such problems result in higher rates for the consumer as well as possible energy curtailment.

Briefly, the fluctuating energy consumption as described above results in problems for the utility companies in that their ability to meet the demand during peak demand periods is constantly being reduced as the demand for energy increases. Until recently, this presented no problems in that when the demand went up the utilities simply acquired more fuel for the production of energy or built more power generating facilities. Such solutions are no longer a simple matter due to environmental considerations, availability of fuel to distribute to consumers or to operate generating equipment, the greatly increased cost of building facilities, and the like.

Since the problems of supplying more energy are extremely difficult to solve, the utilities and others are looking to methods for decreasing the peaks of fluctuating power demands. One method currently being studied is a dual pricing system for encouraging consumers to voluntarily spread out their energy demands. Another method being considered is to force the consumer to reduce his demand during peak demand periods by shutting off power to selected energy consuming equipment during those peak periods.

As described above, the prior art techniques do not utilize energy in an efficient manner, and in addition to those techniques being inefficient, the various types of energy consuming devices employed do not ease the problem. Those devices are, in general, single energy form utilization mechanisms and thus lack the versitility needed to accomplish their tasks by employing energy in various forms when those energy forms are efficiently and economically available. For example, a gas operated heater as we know it today, derives its heating capability solely from gas and lacks the capability of deriving heat from any other energy forms such as electric, solar, or the like. Such lack of versitility can be a serious problem to the consumer in that the tasks he wants his equipment to accomplish simply cannot be accomplished in the event that his single energy form is curtailed for any reason.

Some systems have been devised for the storage and utilization of thermal energy in a more efficient manner and those systems have not been commercially successful heretofore due to the high cost and readily available supply of fossil fuels.

In general, those prior art systems employed a pair of thermal energy storage tanks interconnected by a heat exchanger for transferring thermal energy from one to the other of the tanks to provide a cold and heat storage tank. The tanks are coupled to various thermal energy input and utilization devices.

In addition, the high cost and available fossil fuels, and other factors contributed to the lack of success of those prior art systems. Among those other factors are the high initial costs for construction and the relative low efficiency of the prior art thermal energy storage tanks.

In view of the foregoing, a need exists for a new and useful consumer oriented system for utilizing various forms of energy when readily available and storing the energy for efficient utilization in a manner which overcomes some of the problems of the prior art.

SUMMARY OF THE INVENTION

In accordance with the present invention, a consumer oriented thermal energy storage and utilization system is disclosed which is adapted to employ various forms of energy when those energy forms are readily available and most efficiently and economically obtained. Those energy forms are employed to treat a thermal energy storage medium so that when needed, the system will utilize the stored thermal energy to accomplish various heating and cooling tasks.

The thermal energy storage and utilization system includes at least a pair of thermally insulated tanks each containing a working liquid which is capable of readily absorbing and emitting thermal energy. The tanks are interconnected by a heat exchanger means such as a conventional compressor or heat pump. The heat exchanger means functions to remove thermal energy from one of the tanks and transfer that thermal energy to the other tank. In this manner, one of the tanks becomes a cold storage tank and the other becomes a heat storage tank. This transferring of thermal energy can be accomplished most efficiently by operating the heat exchanger means during off peak power demand periods which will help ease the prior art problem of fluctuating power demands. Since the heat exchanger means is being employed to treat a storage medium rather than a zone of use, it will be seen that the heat exchanger means will not be operating in response to the demand from the zone of use. Thus, the heat exchanger will not be operated under the prior art demand basis technique with its associated demand timeing and intermittent delivery problems. Therefore, the heat exchanger means can accomplish its task when it is most efficient and economic to do so. By utilizing the heat exchanger means in this manner, the power consumption and size of the heat exchanger means is substantially reduced in comparison to conventionally employed heating and cooling equipment.

Among the various heating and cooling functions which may be accomplished by employing the thermal energy storage and utilization system of the present invention, is the selective circulation of either the heated or the chilled liquid through a suitable air handling device for conditioning the air that is to be delivered to a zone of use. In a heating cycle of such a system, heated liquid from the heat storage tank is circulated in a closed loop through the air handling device in a manner which heats the air being delivered thereby. In a similar manner, a cooling cycle is accomplished by circulating chilled liquid from the cold storage tank through the same air handling device. It may be seen that the circulation of liquid through the air handler as described above eliminates the problems of intermittent delivery of prior art heating and cooling techniques, as the system of the present invention is capable of a constant delivery type of operation.

Other heating and/or cooling tasks may be accomplished with appropriate equipment such as the cold storage of food, cooling of machinery, heating of domestic water supplies and the like.

During a heating cycle of the type described above, thermal energy will be dissipated in accomplishing various tasks and the thermal energy will need to be replaced. The replacement of thermal energy may be accomplished by coupling various types of thermal energy input devices to the storage system of the present invention. Devices for accomplishing the thermal energy input function may take the form of a solar energy collector panel or any of the well known gas, coal, or electrically operated heating devices. By employing various types of input devices, the system is capable of utilizing various energy forms when those energy forms are efficiently and economically available.

During a cooling cycle, excessive quantities of heat may be accumulated and, in the event that all of such heat cannot be usefully employed as in the heating of domestic water supplies, the excessive amount of heat may be dissipated by circulation of the heated liquid through a suitable device which radiates the heat into the atmosphere or by employing a cooling tower.

In the preferred embodiment of the present invention, the storage tanks are formed by drilling or otherwise providing vertically disposed columnar shafts in the ground and lining those shafts with suitable thermally insulative leakproof pliable material. In this manner, tank construction costs are minimized and the thermal storage and utilization efficiencies are maximized by taking advantage of the well known principle of temperature stratification.

Accordingly, it is an object of the present invention to provide a new and useful consumer oriented energy utilization system.

Another object of the present invention is to provide a new and useful consumer oriented energy storage and utilization system.

Another object of the present invention is to provide a new and useful thermal energy storage and utilization system having minimum construction costs, minimum operating costs and maximum efficiency.

Another object of the present invention is to provide a new and useful thermal energy storage and utilization system which employs various forms of energy for the operation thereof and employs those energy forms when it is most economic and efficient to do so.

Another object of the present invention is to provide a new and useful thermal energy storage and utilization system which employs various forms of energy to produce thermal energy which is stored and subsequently used to accomplish a variety of heating and cooling tasks.

Another object of the present invention is to provide a new and useful thermal energy storage and utilization system which employs at least a pair of vertically disposed columnar tanks which contain working liquids for the storage of thermal energy therein.

Another object of the present invention is to provide a new and useful system of the above described character which employs at least a pair of thermal energy storage tanks having a heat exchanger means coupled therebetween for transferring thermal energy from one of the tanks to the other so that those tanks become cold storage and heat storage tanks, with the system also including various forms of thermal energy input, output, and utilization devices.

Another object of the present invention is to provide an improved system for the storage and utilization of thermal energy of the type in which thermal energy is stored in at least a pair of storage tanks with the improvement being in storage tanks of minimum construction and installation costs and maximum efficiency.

Another object of the present invention is to provide an improved system for the storage and utilization of thermal energy wherein the improvement lies in the utilization of at least a pair of storage tanks each enclosed within a vertical columnar shaft below the earth's surface and each comprising a thermally insulative, pliable, leakproof liner.

Still another object of the present invention is to provide an improved method for construction and installation of thermal energy storage tanks.

The foregoing and other objects of the present invention, the various features thereof as well as the invention itself, may be more fully understood from the following description when read in conjunction with the accompanying drawings.

DESCRIPTION OF THE PREFERRED EMBODIMENT

Figure 1:
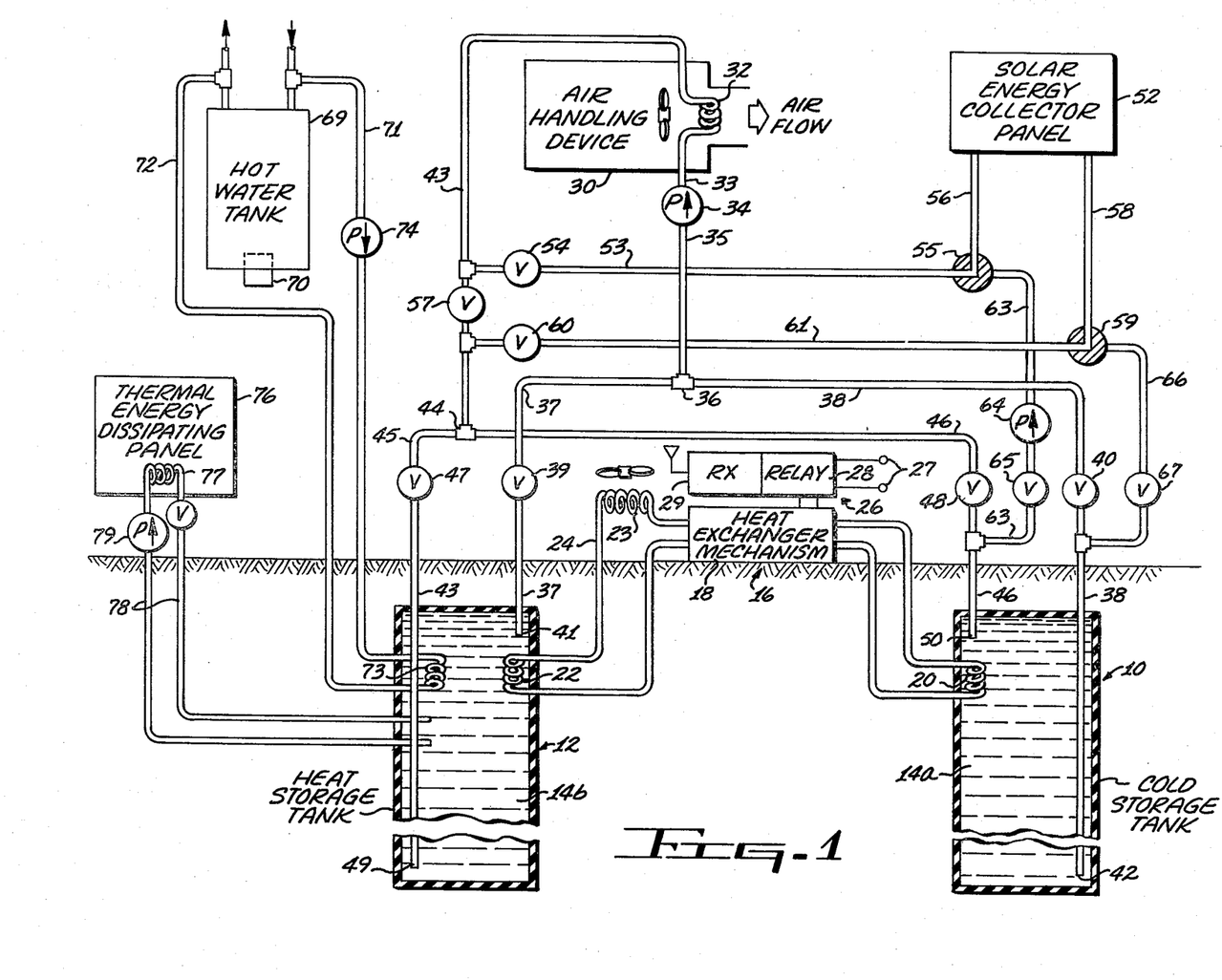
FIG. 1 is a diagrammatic illustration of the thermal energy storage and utilization system of the present invention showing the various features thereof.
Figure 2:
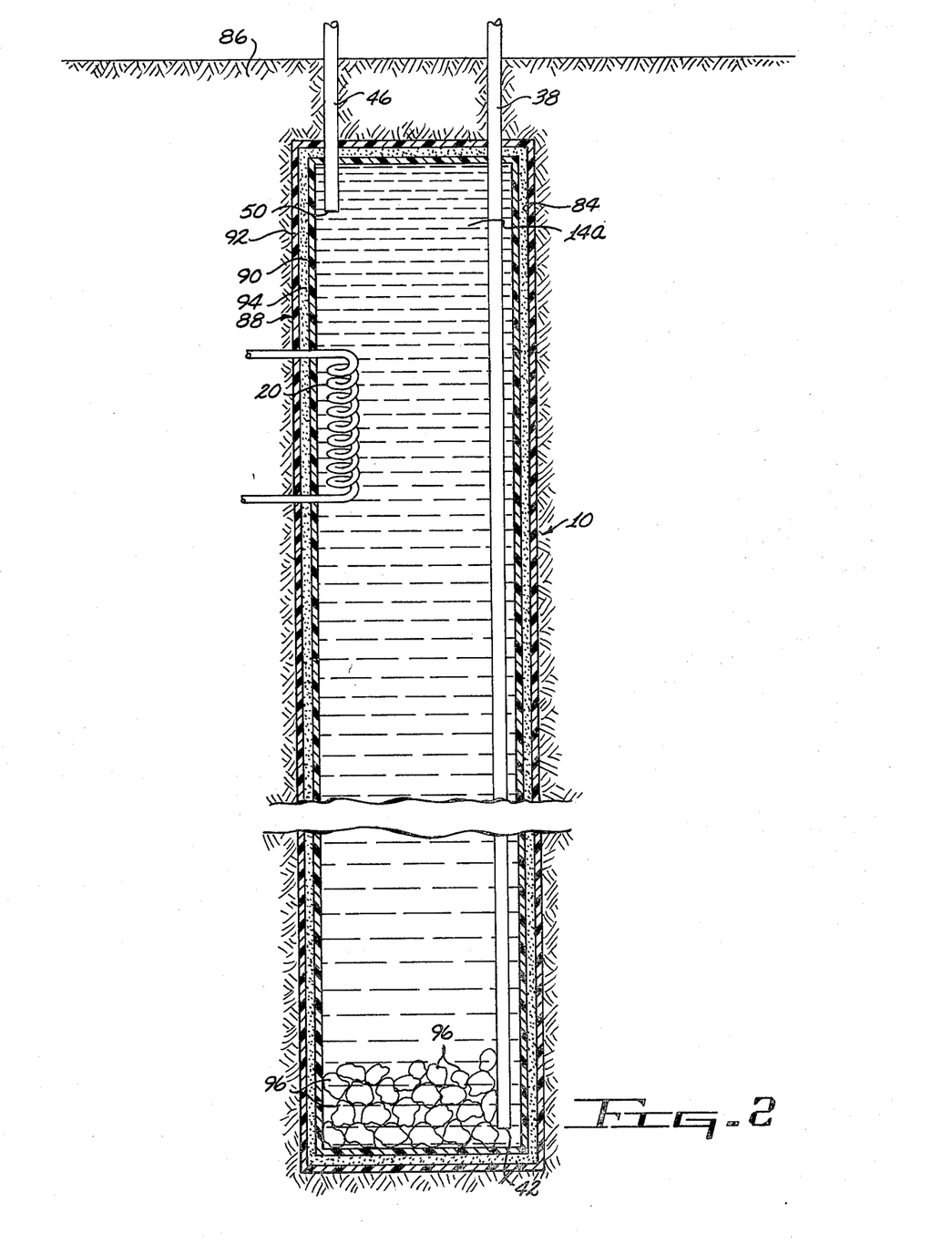
FIG. 2 is a sectional view of a typical one of the storage tanks employed in the thermal energy storage and utilization system of the present invention.

Referring more particularly to the drawings, FIG. 1 illustrates the thermal energy storage and utilization system of the present invention in schematic form and as including a first or cold storage tank 10 and a second or heat storage tank 12. It should be understood that a particular configuration of the storage tanks is preferred for cost of construction and thermal efficiency reasons, and that preferred configuration is shown in FIG. 2 and will hereinafter be described in detail.

Each of the storage tanks 10 and 12 are filled with a working liquid 14a and 14b which may be water or any other liquid having a good thermal capacity.

The storage tanks 10 and 12 have a heat exchanger system 16 coupled therebetween for transferring thermal energy from the cold storage tank 10 to the heat storage tank 12. The heat exchanger system 16 may be in the form of a heat pump (not shown) or may be a conventional refrigeration unit of the type commonly employed in home and automobile air conditioning applications. Such systems are well known and therefore, the operation and components thereof will only briefly be described for completeness of this description. The heat exchanger system 16 includes a heat exchanger mechanism, in the form of a conventional compressor shown in block form and indicated by the reference numeral 18. The heat exchange mechanism 18 is coupled to an evaporator means 20 located in the cold storage tank 10 and is coupled to a condenser means 22 located in the heat storage tank 12. A suitable refrigerant (not shown), such as Freon, is circulated in the well known manner through the heat exchanger system 16 so that thermal energy in the cold storage tank 10 is absorbed by the evaporator means 20 and is transferred by the heat exchanger mechanism 18 to the condenser means 22 which expells the thermal energy into the heat storage tank 12. In this manner, the liquid 14a in the cold storage tank 10 will be chilled and the liquid 14b in the heat storage tank 12 will be heated. It will be understood that the above described description of the heat exchanger system 16 is basic and that the system will contain other components that are necessary for operation of such a system. For example, a heat exchanger coil 23 is located in the line 24 from the condenser means 22 to the heat exchange mechanism 18. The coil 23 is employed to dissipate excessive amounts of heat into the atmosphere when the liquid 14b in the tank 12 is heated to a point where it cannot absorb all the heat being transferred thereto by the heat exchanger mechanism 18.

Systems of the above described heat exchanger type are normally controlled solely by a thermostat (not shown) which actuates the system in response to predetermined temperature changes. The heat exchanger system 16 may be operated in this same conventional manner, however, in order to level off or dampen the fluctuating demand power loads currently being placed on power generating facilities, the heat exchange system 16 is provided with a control means 26. The control means 26 is mounted in the power line 27 to the heat exchanger mechanism 18 and operates to supply power thereto during off peak power demand periods and to interrupt the power during peak demand periods. The control means 26 may include a relay which is actuated and deactuated by a control signal coupled thereto from a suitable radio receiver 29. The receiver 29 will generate the control signal in response to a radio signal transmitted thereto from a power controlling agency such as a utility company. Thus, when the control means 26 is actuated to shut off power to the heat exchanger system 16, the system of the present invention may act as a storage battery in that the thermal energy stored therein may be employed to perform various heating and cooling functions which would otherwise be accomplished by electricity. Likewise, when the control means 26 is actuated to supply power to the heat exchanger system 16, the heat exchanger system will operate under normal thermostatic control and will act like a generator to recharge the storage battery.

The control means 26 as described above is one type of device which may be employed to implement the above described control function, but it should be understood that other devices may be employed to perform that function such as a time clock mechanism (not shown).

It will be apparent that a variety of heating and cooling functions may be accomplished by selectively employing either the heated liquid 14b in the tank 12 or the chilled liquid 14a in the tank 10. An example of one such heating and cooling function will now be described in detail.

As shown in FIG. 1, an air handling device 30 is provided with at least one heat exchanger coil 32 therein with that coil being adapted to have either the chilled liquid 14a or the heated liquid 14b selectively circulated therethrough. The coil 32 is disposed in the air movement path through the air handler device 30 so that the air being delivered thereby will pass over the coil and will be either heated or cooled by the liquid in the coil prior to the air being delivered to a use zone such as a home (not shown). Air handling devices which employ heated or chilled liquids for air conditioning purposes are well known in the art and any of such devices may be employed in the system of the present invention. A particular type of air handler which is ideally suited for this application is fully disclosed in U.S. Pat. No. 3,802,493, issued on Apr. 9, 1974 to the same inventor. That particular air handling device is particularly well suited for use in the present system in that the device, as described in the patent, is capable of performing the additional functions of evaporative cooling and air humidification. Thus, such a device would enhance the versitility of the system of the present invention.

Liquid is supplied to the heat exchanger coil 32 through an inlet pipe 33 from a suitable pump 34. A pipe 35 supplies liquid to the pump and that pipe 35 has a tee 36 thereon which is connected to a heated liquid supply pipe 37 and a chilled liquid supply pipe 38. The supply pipes 37 and 38 have shutoff valves 39 and 40, respectively, therein so that either the heated liquid 14b or the chilled liquid 14a can be selectively supplied through the pump 34 to the coil 32. As shown, the heated liquid supply pipe 37 extends into the heat storage tank 12 and has the inlet opening 41 thereof disposed adjacent the top of the tank. In this manner, the liquid removed from the tank 12 will be taken from the hottest possible point in that tank. The chilled liquid supply pipe 38 extends into the cold storage tank 10 and has the inlet opening 42 thereof disposed adjacent the bottom of the tank 10 so that the liquid removed from that tank will be taken from the coldest location of that tank.

An outlet pipe 43 from the heat exchanger coil 32 has a tee 44 thereon which is coupled to a heated liquid return pipe 45 and to a chilled liquid return pipe 46. The return pipes 45 and 46 have shutoff valves 47 and 48, respectively, therein so that when the liquid has passed through the coil 32, the liquid may be selectively directed through either of the return lines 45 or 46 to the appropriate one of the storage tanks 10 or 12. The heated liquid return pipe 45 is positioned to have its outlet 49 dispoed adjacent the bottom of the tank 12 so that the heated liquid that has been reduced in temperature by passage through the coil 32 will be returned to the coolest location in the heat storage tank 12. The chilled liquid return pipe 46 has its outlet 50 disposed adjacent the top of the tank 10 so the chilled liquid that has been elevated in temperature by passage through the coil 32 will be returned to the warmest location in the cold storage tank 10.

Thus, it may now be seen that with proper positioning of the shutoff valves 39, 40, 47, and 48, liquid may be selectively supplied to the air handler device 30 through closed loop liquid flow lines to perform either a heating or a cooling function.

During a heating cycle such as the one described above, thermal energy is taken from the cold storage tank 10, transferred to the heat storage tank 12 and is then utilized in the air handling device 30. If such a heating cycle is to continue in an efficient manner, the extracted thermal energy will need to be replenished.

This can be accomplished in various ways such as with a conventional coal, gas, or electric heating device (not shown), by utilization of waste heat such as from a clothes drier, oven, and the like (not shown). Thus, means for replacement of extracted thermal energy must be coupled to the system of the present invention, and such a means preferably takes the form of a solar collector panel 52.

The solar energy collector panel 52 may be of any well known type and may be selectively operated to supply thermal energy to either the cold or heat storage tanks 10 and 12.

To supply thermal energy directly to the heat storage tank 12, a supply pipe 53 is connected to the outlet pipe 43 from the coil 32 of the air handling device 30 so that liquid emerging from the coil 32 will flow through the supply pipe 53, through an open shutoff valve 54, through an appropriately positioned flow switching valve 55 and into the solar collector panel 52 through an inlet pipe 56. To divert the liquid flow into this path, the outlet pipe 43 from the coil 32 is provided with a shutoff valve 57 downstream of the connection of the supply pipe 53 therewith. After the diverted liquid has been circulated through the solar energy collector panel 52, it will emerge therefrom through an outlet pipe 58, through an appropriately positioned flow switching valve 59, through a shutoff valve 60 located in the return pipe 61. The return pipe 61 is connected to the outlet pipe 43 from the coil 32 downstream of the shutoff valve 57. The diverted liquid having thus been returned, the outlet pipe 43 will be directed into the heat storage tank 12 through the return pipe 45 as hereinbefore described. It will be noted that the addition of thermal energy to the heat storage tank 12 may be accomplished simultaneously with the heating cycle of the air handler device 30 and the circulation of liquid necessary to accomplish both of those functions is provided solely by the pump 34.

To supply thermal energy to the cold storage tank 10, a supply pipe 63 is connected to the liquid return pipe 46 leading from the coil 32 to the tank 10, and that connection is made on the tank side of the shutoff valve 48 in the pipe 46 so as not to interfere with the heating cycle of the air handling device 30. A pump 64 is mounted in the supply pipe 63, and that pump draws liquid from the tank 10 through the supply pipe 63, through an open shutoff valve 65 provided in the pipe 63 and through the flow switching valve 55 which is repositioned from its previously described position so that the liquid in the supply pipe 63 passes therethrough to the inlet pipe 56 of the solar energy collector panel 52. After having been circulated through the solar panel 52, the liquid supplied thereto from the cold storage tank 10, as described, is returned to that tank through the outlet pipe 58, through the repositioned flow switching valve 59 into the return pipe 66. The return pipe 66 is provided with a shutoff valve 67 therein and is connected to the supply pipe 38 from the tank 10 to the coil 32.

In addition to the above described heating cycle of the air handling device 30, the heated liquid 14b in the heat storage tank 12 may be employed to perform other heating tasks such as the heating of a domestic water supply. To accomplish such a heating task, a conventional hot water tank 69 having the usual water heating element 70 is connected by means of a supply pipe 71 and a return pipe 72 to a heat exchanger coil 73 located in the heat storage tank 12. Circulation of the water through the pipes 71 and 72 and the coil 73 is accomplished by a suitable pump 74 located in the supply pipe 71. Thus, the water in the hot water tank 69 may be heated primarily by the storage system of the present invention with the conventional heating element 70 serving as a stand-by heat source. Thus, it may now be seen that the hot water tank 69 acts as a thermal energy utilization device when employed as described above. That same type of operation will also cause the hot water storage tank 69 to act as a thermal energy dissipating means during a cooling cycle of the present system when excessive amounts of heat may be accumulated in the heat storage tank 12. Another function may be performed by the hot water tank 69 in that the hot water tank 69 may act as a thermal energy input device to the system. In instances when it is not practical or possible to replenish dissipated thermal energy by other means, the heating element 70 of the hot water tank 69 may be actuated to heat the water in the tank 69 and that heated water may be circulated through the heat exchanger coil 73 in the manner previously described so as to supply thermal energy to the heat storage tank 12. Such an operation could be employed in various circumstances such as in prolonged periods of cloudy weather when the solar energy collector panel 52 cannot provide sufficient thermal energy.

During a cooling cycle such as the one hereinbefore described with reference to the air handling system 30, the thermal energy transferred to the heat storage tank 12 may accumulate therein in excessive amounts to a point where the heat exchanger system 16 cannot efficiently function. In the event that the accumulated thermal energy cannot all be utilized by the above described domestic water heating device, other types of thermal energy utilization devices may be employed. Such thermal energy utilization devices may include mechanisms for warming food, drying clothes, and the like. In the event that the excessive amounts of thermal energy cannot be usefully dissipated, an atmospheric radiating means 76 may be employed. The atmospheric radiating means 76 may take the form of a radiating coil 77 in which heated liquid 14b from the heat storage tank 12 is circulated by means of a closed loop feed pipe 78 having a suitable pump 79 therein.

Reference is now made to FIG. 2 wherein a typical one of the thermal energy storage tanks 10 and 12 is shown. It should be understood that the cold and heat storage tanks 10 and 12 are basically the same with the hereinbefore described exceptions relating to locations of pipes, heat exchanging mechanisms, and the like. Therefore, the following description relating to the structural details of the cold storage tank 10 will be understood to also be applicable to the heat storage tank 12.

The storage tank 10 is in the form of a vertically disposed columnar shaft or cavity 84 formed in the earth below the surface thereof with a thermally insulated, pliable, leakproof liner 88 disposed therein.

The columnar shaft 84 is preferably formed by drilling, such as with an auger (not shown), for the obvious economic advantages of drilling such a shaft as compared, for example, to the digging, back filling and other things involved in the construction and installation of a rectangular, square, or other horizontally disposed structure (not shown).

The thermally insulated, pliable, leakproof liner 88 is disposed within the columnar shaft 84 so as to be enclosed therein and is adapted to contain the liquid 14. The liner 88 is preferably formed of an inner skin 90 and an outer skin 92 with the latter being configured to substantially conform to the configuration of the columnar shaft 84. The inner skin 90 is similarly configured and is smaller to provide a space therebetween for containment of a suitable thermally insulative material 94. The inner and outer skins 90 and 92, respectively, may be formed of any suitable pliable, waterproof material such as any of the well known so-called plastics. The insulative material 94 may be any pliable material having high thermal insulative properties such as pelletized styrofoam, rockwool, Fiberglass and the like.

In addition to the above described advantage of drilling the columnar shaft 84 and employing a conforming pliable liner 88, additional cost advantages are derived from such a configuration in that structural supporting of the tank 10 is accomplished by the liner 88 being disposed in bearing engagement with the side and end walls which define the cavity 84 with that bearing engagement being maintained by the liquid 14 within the liner 88. Thus, no rigid walls or wall supporting members need be employed.

The vertically disposed columnar configuration of the storage tanks 10 and 12 are also advantageous from a thermal efficiency standpoint in that the liquids therein can be removed from and returned to the tanks at widely separated locations to retard intermingling thereof and to take advantage of the principle of temperature stratification.

It is well known that various factors influence temperature stratification in tanks of the instant type, with such factors being, thermal losses from the tank to its surroundings, operating temperatures, liquid flow rates and the like. Although temperature stratification in liquid thermal storage systems is not well known in regard to the prediction of temperature stratification, it is known that temperature stratification can increase over-all system performance by as much as ten (10) percent. This can be seen upon consideration of the improved thermal efficiencies obtainable in a thermal energy input device when a lower temperature liquid is returned thereto, and the improved efficiency of a thermal utilization device when a higher temperature liquid is supplied thereto.

It is known that temperature stratification in this type of thermal energy storage tanks is virtually nonexistent, or at least negligible, in tanks having a height to diameter ratio of one or less and useful temperature stratification does not occur until the height to diameter ratio is greater than one. Storage tanks suitable for this purpose may be sized approximately as given below in typical examples of such tank structures. A first example would be a tank having a diameter of two (2) feet and a height of between 20 and 30 feet. A second example would be a tank with a diameter of three (3) feet and a height between 30 and 40 feet. It should be understood that the above tank sizes are merely illustrative and are not to be construed as limitations of the present invention.

It may now be seen that the most economical way to increase thermal efficiency and to provide a desired volume of storage in systems of the instant type is to employ storage tanks configured and installed in accordance with present invention.

Still another advantage is derived by employing storage tanks of the above described configuration in that such tanks have a relatively rapid recovery rate when compared to conventionally configured storage tanks. Consider the heat storage tank 12 of the present invention as having been employed to a point where the thermal energy stored therein is depleted. Replacement of the thermal energy is of course, accomplished by the condenser means 22 located near the top of the tank. Due to temperature stratification and the columnar configuration of the tank 12, heat buildup in the relatively small volume area at the upper end of the tank will be relatively rapid in comparison to a conventional tank of non-columnar configuration having a relatively large volume at its upper end. Thus, with the storage tanks 10 and 12 configured as described above, the upper portions of those columnar tanks will reach suitable operating temperatures at a relatively rapid rate.

The thermal capacity of the storage tanks 10 and 12 may be enhanced by placing thermal energy retaining objects therein such as stones 96 as is well known in the art.

Figure 3:
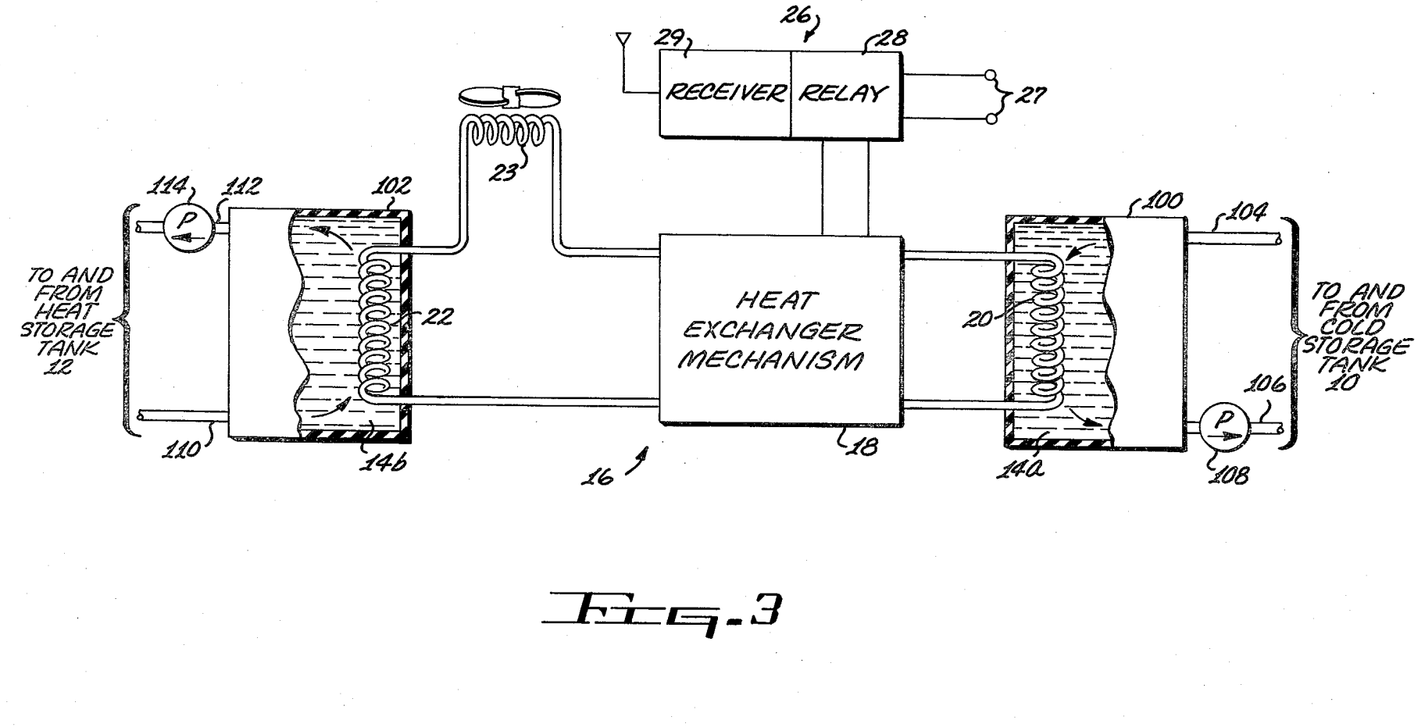
FIG. 3 is a diagrammatic view of a modified form of employing a heat exchanger means that interconnects the storage tanks for transferring thermal energy.

Reference is now made to FIG. 3 wherein a modified form of transferring thermal energy from the cold storage tank to the heat storage tank is illustrated. In this modification, the evaporator means 20 of the heat exchanger system 16 is dispoed within an above ground liquid chilling tank 100, and the condenser means 22 is positioned within an above ground liquid heating tank 102. Liquid 14a from the cold storage tank 10 is supplied to the chilling tank 100 through a pipe 104 and is returned to the cold storage tank 10 by a pipe 106 in which a suitable pump 108 is located. Similarly, the liquid 14b from the heat storage tank 12 is supplied to the liquid heating tank 102 through a pipe 110 and is returned to the heat storage tank 12 by a pipe 112 in which a pump 114 is provided.

It should be noted that this modified form of transferring thermal energy will accomplish the same objectives as the previously described method but will provide the advantage that the evaporator means 20 and condenser means 22 are above ground and thus simplifying installation and servicing. It will also be noted that the previously described functions relating to thermal energy input and dissipation may be accomplished with above ground equipment.

It should be obvious that in some instances the thermal energy storage capacity of the storage system as described above will be insufficient to meet the requirements of some types of consumer establishments such as large homes, apartment complexes, commercial buildings, and the like. Rather than excessively increasing the size of the individual tanks, which could increase the construction costs thereof, or alter the preferred configuration, which would also be costly and would decrease the thermal efficiency, it is preferred that a plurality of tanks be employed with each tank constructed and configured in accordance with the method described above. A plurality of such storage tanks (not shown) may be suitably interconnected and have suitable switching devices (not shown) so that the tanks may be operationally interchanged for utilization and recharging cycles. Such multiple storage tanks (not shown) could also be interconnected in series to increase the liquid capacity of the system.

While the principles of the invention have now been made clear in an illustrated embodiment, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. A thermal energy storage system comprising:
   (a) at least a pair of storage tanks each containing a heat absorbing liquid;
   (b) a heat exchanger system connected between said pair of storage tanks so as to be in contact with the liquids thereof, said heat exchanger system operable to transfer thermal energy from the liquid of one of said pair of storage tanks to the liquid of the other of said pair of storage tanks; and
   (c) each of said pair of storage tanks comprising:
      (I) an elongated vertically disposed columnar shaft formed in the earth below the surface thereof, said shaft being closed,
      (II) a pliable, thermally insulative, leakproof liner within said shaft for containing the heat absorbing liquid, said liner in bearing supportive engagement with the side and end walls which define said shaft so that structural support of said liner is provided by the disposition thereof between the walls of said shaft and the liquid contained therein.

2. A thermal energy storage system as claimed in claim 1 wherein said thermally insulative leakproof liner comprises:

(a) an outer skin of pliable plastic material configured to substantially conform to the configuration of said columnar shaft;

(b) an inner skin of pliable plastic material located within said outer skin and configured to substantially conform to the configuration of said outer skin, said inner skin smaller than said outer skin to provide a space therebetween; and (c) a pliable thermally insulative material in the space between said outer skin and said inner skin.

3. A thermal energy storage and utilization system comprising:

(a) at least a pair of storage tanks each containing a heat absorbing liquid;

(b) each of said storage tanks comprising:

(I) an elongated vertically disposed columnar shaft formed in the earth below the surface thereof, said shaft being closed;

(II) a pliable thermally insulative leakproof liner within said shaft for containing the heat absorbing liquid, said liner in bearing supportive engagement with the side and end walls which define said shaft so that structural support of said liner is provided by the disposition thereof between the walls of said shaft and the liquid contained in said liner;

(c) a heat exchanger system connected between said pair of storage tanks so as to be in contact with the liquids contained in said tanks, said heat exchanger system operable to extract thermal energy from the liquid of one of said storage tanks and supply that extracted thermal energy to the liquid of the other of said storage tanks;

(d) thermal energy utilization means connected to at least one of said pair of storage tanks for utilization of the thermal energy stored in the liquid thereof; and (e) thermal energy input means connected to at least one of said pair of storage tanks for supplying thermal energy to the liquid thereof.

4. A thermal energy storage and utilization system as claimed in claim 3 and further comprising control means in the power supply of said heat exchanger system for selectively interrupting power thereto.

5. A thermal energy storage and utilization system as claimed in claim 3 and further comprising thermal energy dissipating means coupled to at least one of said pair of storage tanks and actuatable for dissipating excessive amounts of thermal energy stored in the liquid thereof.

6. In combination with a system of the type wherein a heat exchanger is connected between at least a pair of thermal energy storage tanks for transferring thermal energy from one to the other of said tanks and having means for supplying and utilizing the thermal energy, wherein the improvement comprises:

(a) each of said pair of thermal energy storage tanks includes a pliable, thermally insulative leakproof liner of elongated configuration;

(b) each of said pair of thermal energy storage tanks enclosed within a different vertically disposed columnar shaft of elongated configuration formed in the earth below the surface thereof and disposed in their respective columnar shafts so that said liners are in bearing engagment with the side and end walls which define said shafts; and (c) a liquid within each of said pair of thermal energy storage tanks for absorbing thermal energy and for structurally supporting said liners in bearing engagement with the side and end walls which define their respective ones of said columnar shafts.

7. The combination of claim 6 wherein each of said columnar shafts and each of said liners are of substantially cylindrical configuration.

8. The combination of claim 6 wherein each of said thermal energy storage tanks is of substantially cylindrical configuration with a height to diameter ratio of greater than one for temperature stratification of said liquids in said storage tanks.

9. The combination of claim 6 wherein said thermally insulated leakproof liners each comprise:

(a) an outer skin of pliable plastic material configured to substantially conform to the configuration of its respective one of the said columnar shafts;

(b) an inner skin of pliable plastic material located within said outer skin and configured to substantially conform to the configuration of said outer skin, said inner skin smaller than said outer skin to provide a space therebetween; and (c) a pliable thermally insulative material in the space between said outer skin and said inner skin.

* * * * *